Patented Jan. 27, 1942

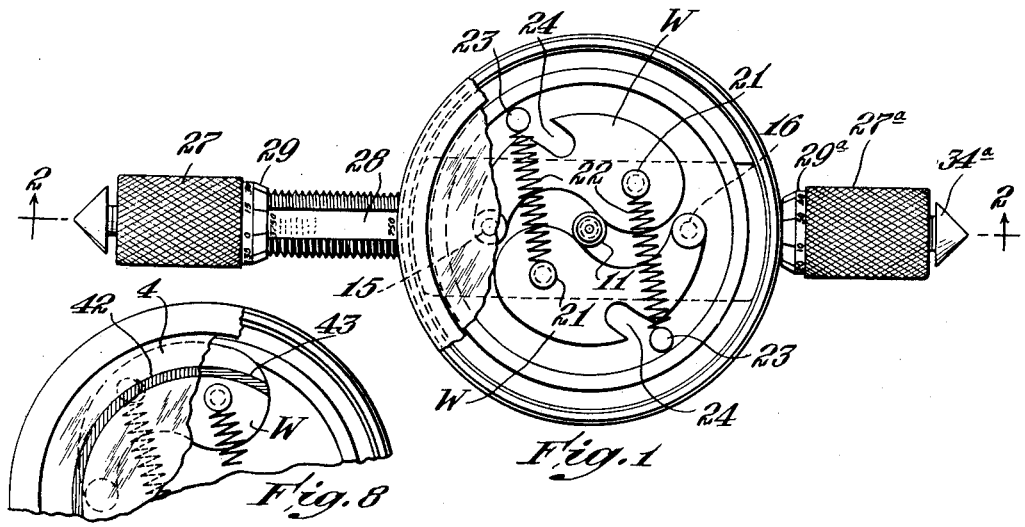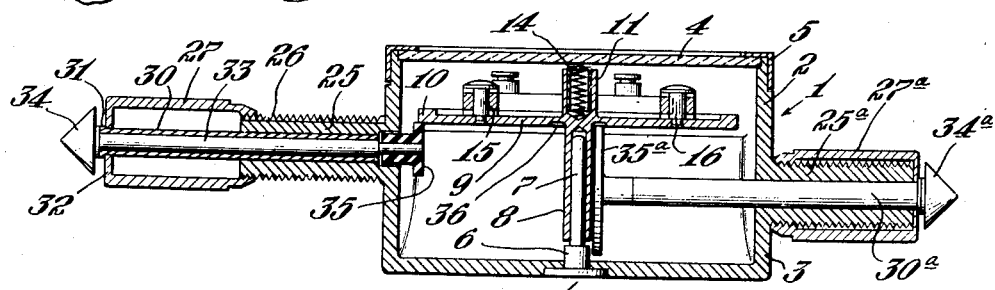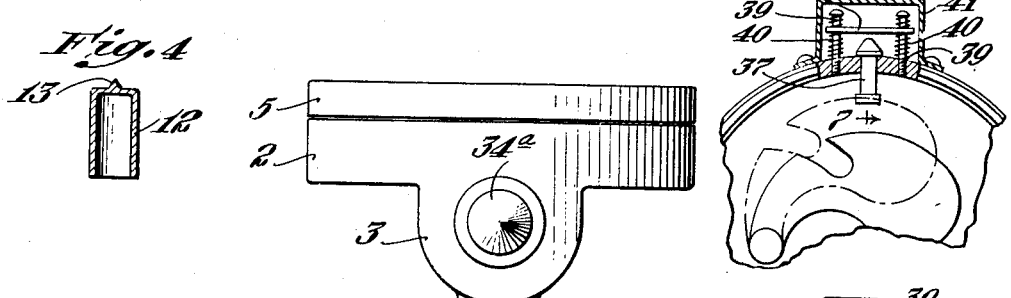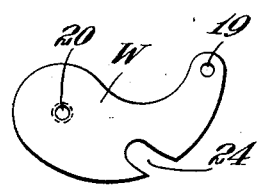

2,271,215

UNITED STATES PATENT OFFICE 2,271,215

TACHOMETER

Preston Whitcomb, Bridgeport, and Henry S. Moore, Easton, Conn., assignors to Manning, Maxwell & Moore, Incorporated, New York, N. Y., a corporation of New Jersey Application July 1, 1941, Serial No. 400,708

2 Claims. (Cl. 264—2)

This invention pertains to apparatus for use in determining the angular velocity of a rotating member, more particularly to a portable instrument or tachometer comprising a rotating contact part which may be brought into driving contact with the rotating member whose speed is to be determined so that said contact part will be turned at the same speed as said member.

The use of instruments of this kind, as heretofore most commonly devised, requires the employment of some type of clock mechanism either as a part of the instrument itself or as an independent device (for instance, a stop watch) in order to obtain the desired rate of rotation, for example, the number of revolutions per minute. However, such clock mechanism, if at all accurate, is delicate and expensive and its use introduces a substantial probability of error on the part of the operator, who is required to coordinate the reading of the rotation indicator and that of the clock device.

The present invention has for its principal object the provision of an instrument of very simple and durable and inexpensive construction, which is of small dimensions and light in weight, and which gives direct and accurate readings of the speed of rotation without reference to or the use of any clock mechanism whatsoever.

A further object is to provide an instrument of this kind which is capable of accurately indicating the speed of rotation throughout a very wide range of speeds.

Other and further objects and advantages of the invention will be pointed out in the following more detailed description and by reference to the accompanying drawing, wherein Fig. 1 is a plan view of the instrument with a portion of the transparent cover plate broken away in order more clearly to show the interior mechanism;

Fig. 2 is a vertical section on the line 2—2 of Fig. 1;

Fig. 3 is a side elevation of the device viewed from the right-hand side as it is shown in Fig. 2;

Fig. 4 is a vertical section, to larger scale, illustrating a spring housing cap forming a desirable element of the instrument;

Fig. 5 is a plan view of one of the governor elements;

Fig. 6 is a fragmentary diametrical section through the case of the instrument, illustrating one form of signal means which may be employed;

Fig. 7 is a fragmentary section on the line 7—7 of Fig. 6; and

Fig. 8 is a front elevation of the instrument, showing another form of signal or indicating means.

Referring to the drawing, the numeral 1 designates the case of the instrument, such case being of any desired material, for example metal, a moulded plastic or the like, and being here illustrated as of circular contour. The upper portion 2 of the case is substantially cylindrical, while its lower or rear portion comprises the transverse rearwardly projecting elongate hollow boss 3. However, the exact shape of the case is immaterial so far as the invention is concerned,— the case here illustrated being of a shape which is convenient for handling and which provides the requisite interior space with economy in material. The front of the case is normally closed by a transparent panel 4 of glass or other suitable material which is removably held in place by means of the bezel 5.

A base member 6 is fixedly secured in the bottom or rear wall of the case, such base member 6 being provided, if desired, with a flange which is embedded or otherwise anchored to the material forming the case. This base supports or has formed integrally therewith the fixed stub shaft or pintle 7 coaxial with the case and upon which turns freely the elongate cylindrical sleeve member 8. As here illustrated, this sleeve member is integral with a disk-like support 9 which is coaxial with the sleeve 8 and pintle 7, the disk and the sleeve 8 being of any suitable material, for example metal, a synthetic resin or the like,—the sleeve having an internal bore of such dimensions as to permit the sleeve and disk to turn freely about the axis of the pintle 7. As here illustrated, the disk 9 is furnished with a thickened rim 10, in order to provide the requisite strength, and also has an upwardly or forwardly projecting hollow hub 11 within which is disposed an elongate cup-like member 12 (Figs. 2 and 4) having at its upper end a conical boss 13 which is caused to press against the inner surface of the glass panel 4 by means of a light coiled spring 14 which is disposed within the cup 12 and which bears against the bottom of the socket in the hub 11. The tip of the conical boss 13 bears with light pressure against the inner surface of the glass panel, forming in effect an outboard bearing for the sleeve 8 and disk 9, the action of the spring being to urge the disk 9 with light pressure rearwardly toward the back of the case. The under or rear side of the disk 9 is a plane surface perpendicular to the axis of the pintle 7.

At diametrically disposed points the disk or support 9 is provided with headed pivot pins 15 disposed at equal distances from the axis of rotation of the disk, the inner ends of the pins being fixed in the material of the disk 9. On each of these pins is pivoted a lever arm or weight W constituting centrifugally actuated signal means. Each of these lever arms W is preferably of more or less curved contour and has a heavy free end portion (Fig. 5), each arm having an opening 19 at its smaller end for the reception of the corresponding pin 15 or 16, respectively, and each having a screw-threaded opening 20 near its free larger end for the reception of an anchor pin 21 to which one end of a coiled tension spring 22 (Fig. 1) is secured. The opposite ends of these springs 22 are attached to pins 23 fixed to the disk 9 at diametrically opposite points. The springs 22 tend to move the free ends of the arms or weights W inwardly so that their inner edges come into contact with the outer surface of the hub 11. On the other hand, when the disk is rotated at a rapid rate the arms or weights W move outwardly in opposition to the spring tension, such outward movement being permitted by the notches 24 in the outer edges of the arms.

The case is provided at one side with an outwardly projecting tubular boss 25 which may be integral with the wall of the case or which may be a separate element suitably secured to the wall of the case. In the event that the wall of the case is of plastic material, it may be preferred to form the boss 25 from metal, since the exterior of this boss is accurately screw threaded, as indicated at 26, with a micrometer thread, preferably a thread of twenty turns per linear inch. An externally knurled micrometer cap 27 is internally threaded at one end for engagement with the screw threads 26, and by turning the cap the latter may be caused to move longitudinally of the boss 25. Preferably the boss 25 is slabbed off to form an elongate flat surface 28 for the reception of index graduations, such graduations preferably being in revolutions per minute. The outer end surface 29 of the cap 27 is preferably beveled and also provided with graduations which may likewise be indexed in revolutions per minute, such graduations being aligned with a longitudinal edge of the surface 28 for accurate reading.

For example, a one inch length of the screw-threaded boss 28 may be marked with the number 750 at its inner end to represent seven hundred and fifty revolutions per minute, and at its outer end with the numeral 3750 to represent that number of revolutions per minute, with each intervening twentieth of this inch length properly graduated to represent the corresponding intermediate number of revolutions. The beveled edge 29 of the micrometer cap is conveniently divided into ten equal segments, graduated from 0 to 135, the zero mark also corresponding to 150. Thus each space on the edge of the cap represents fifteen revolutions per minute and by the reading of the graduations on the surface 28 and those on the edge of the cap, the number of revolutions within the entire range may be exactly read to a value of fifteen revolutions per minute, and by eye estimation to a closer amount.

Within the tubular boss 25 there is arranged a sleeve 30 coaxial with the boss and free to slide longitudinally within the boss. At its outer end this sleeve 30 has a flange 31, the sleeve passing out through a central opening in the end wall 32 of the cap 27 and the flange 31 bearing against the outer surface of said end wall, so that any outward movement of the sleeve axially along the boss 25 will cause a similar outward movement of the sleeve 30. The sleeve 30 constitutes an elongate bearing for the drive shaft 33 which is free to turn within the sleeve and which is provided at its outer end, beyond the flange 31, with a conical contact element 34 designed to be engaged with a rotating part and to be driven by the latter at the same speed of rotation as such rotating part.

At the inner end of the shaft 33, and within the case 1, there is secured a friction contact disk 35, the peripheral edge of which is designed to engage the under surface of the disk 9, and thereby, as the disk 35 is rotated, to impart rotative motion to the disk 9.

While the instrument as thus far described may be employed without adjunctive features for indicating the speed of revolution of a rotating part, it may be desirable to furnish means for audibly indicating the proper relative location of the parts at which a reading should be taken. Thus, as illustrated in Figs. 6 and 7, the wall of the case is provided with a guide opening for a radially slidable plunger 37 whose inner end lies substantially in the plane of swinging motion of the weights W, so that when such weights move out to a certain position under the action of centrifugal force they will contact the inner end of the plunger 37 and impart a quick outward movement to the latter. Outside of the case and in the path of the outer end of the plunger is arranged a metal plate 38, preferably a piece of hardened steel, which, when struck by the outwardly moving plunger, emits a distinct metallic sound readily recognizable by the operator. The opposite ends of the plate 38 are provided with openings which loosely receive parallel pins 39 which project outwardly from the wall of the case and which are embraced by very weak coiled springs 40 which support the sounding plate 38. A suitable housing 41 secured to the outer surface of the case may be provided for protecting the sounding device.

An alternative form of signal is illustrated in Fig. 8, wherein the glass panel 4 is provided with an etched or engraved circle 42 coaxial with pintle 7, while the arms W are provided with arcuate lines 43 which, at the proper point in the outward movement of the arms W, become coaxial with the circle 42, thus visually indicating the proper point for taking a reading.

In order that the instrument may be employed for indicating an even wider range of speeds, the instrument case, as illustrated in Figs. 1 and 2, may be provided with one or more additional bosses similar to the boss 25, with corresponding shafts and friction disks. Thus, as shown, the projecting boss 25ᵃ is similar to the boss 25 but is here shown with its axis disposed farther from the plane of the disk 9 than is the axis of the boss 25. A micrometer cap 27ᵃ cooperates with the boss 25ᵃ and within the boss is arranged a sleeve 30ᵃ in which turns a shaft having secured to its outer end a contact or driving element 34ᵃ and at its inner end a friction disk 35ᵃ. The friction disk 35ᵃ is of a diameter substantially greater than that of the disk 35, so that for a given rate of rotation of the contact member at the outer end of the shaft, a much greater speed of rotation would be imparted to the disk 9 than when the contact member 34 is placed in contact with the rotating part. The contact member 34ᵃ may thus be employed for indicating speeds in a different range from those indicated when the contact member 34 is used.

It will be understood that the diameters of the contact disks 35 and 35ᵃ are accurately calculated with reference to the particular pitch of screw thread employed on the boss 25 or 25ᵃ, respectively, and with respect to the speed range indicated by the graduations on the surfaces 28 and 29. It is preferred, as illustrated in Fig. 2, to furnish the under surface of the disk 9 with an annular groove 36 adjacent to the sleeve 8 to form an idle space for that one of the friction disks which is not in use at any given time.

In the operation of the instrument, when it is desired, for example, to determine the speed of rotation of a driven shaft, the contact member 34 is pressed against the end of the shaft so as to be coaxial with the latter, the shaft usually being provided with an axial countersink into which the contact member may be pressed. When thus pressed against the end of the rotating shaft, the contact member 34 is caused to turn at substantially the same rate as the shaft, thus likewise turning the shaft 33 and the disk 35 and thus causing the disk 9 to rotate. Normally the weight arms W are held inwardly against the hub 11 by the springs 22 and, assuming that the shaft whose speed is to be measured is not running at the maximum velocity capable of being measured by the instrument, the disk 35, which at the beginning of the operation engages the outer portion of the disk 9, will turn the latter at a speed such that the weights W will remain in normal position. The operator now turns the cap 27 so as to cause it to move inwardly along the hub 25. As the disk 35 approaches the center of the disk 9, the ratio of the diameter of the disk 35 to the effective diameter of the disk 9 at the point of contact progressively increases, thus causing the disk 9 to increase its speed. Eventually, assuming that the speed of the shaft whose speed is to be measured is within the range of the instrument, there will come a time during the movement of the cap 27, when the disk 35 will turn the disk 9 at such a speed that the weights W will fly outwardly away from the hub 11.

Assuming the use of springs 22 of proper design, the weighted levers W (which may themselves constitute the signal means) will move out suddenly and substantially to the full limit of their swing when this particular speed of the disk 9 is attained. Such speed is a constant and may be termed a standard speed, depending solely upon the proportions and design of the weights and springs. By direct observation of the change in position of the weights or by the slight noise which these weights may make when they strike the inner wall of the case, the user may note the exact instant at which the weights leave their normal position. Since this is the instant at which the standard speed of the disk 9 has been attained, the user may at once read the corresponding speed of shaft 33 by reference to the position of the cap 27, as shown by the indexed graduations on the surfaces 28 and 29. The user thus directly reads the speed of rotation of the shaft, whose speed is to be measured, by observation of the graduations on the surfaces 28 and 29. No clock mechanism is required and all guess-work is eliminated, the instrument being very accurate in its operation. Since the particular speed at which the weights move outwardly is a constant, and since the graduations on the surfaces 28 and 29 are based upon such constant, it is possible merely by a single reading of this micrometer device to determine accurately and quickly the speed of the rotating part.

Obviously if the instrument be provided with two or more differently graduated micrometer devices, the speed range may be extended as much as may be desired.

As above suggested, instead of depending wholly upon observation of the weights W as the signal means, the latter may be caused to actuate a secondary signal, for instance, an audible signal such as the device shown in Figs. 6 and 7, in which event the outward movement of the weights strikes the plunger 37 and causes the latter to engage the signaling plate 38 or, as illustrated in Fig. 8, the observation of the position in which the weights W are effective for signaling purposes may be facilitated by noting the coincidence of the lines 42 and 43.

While desirable embodiments of the invention have been illustrated by way of example, it is to be understood that the invention is not necessarily limited to these precise arrangements, but is to be regarded as broadly inclusive of any and all equivalent constructions such as fall within the terms of the appended claims.

We claim:

1. In a tachometer, a rotary driving part designed to receive motion from the device whose speed is to be determined, a driven part so associated with the driving part as to permit progressive variation in the speed ratio between said parts, an element which is carried by and which rotates bodily with said driven part and which is so constructed and arranged as to move from a normal to an abnormal position when the speed of the driven part attains a definite predetermined value, and adjusting means for varying the speed ratio of the driving and driven parts, said adjusting means including a relatively movable micrometer screw and cap, the position of the cap axially of the screw always bearing a definite and direct relation to the speed ratio between the driving and driven parts, the cap and screw being indexed to indicate the speed of rotation of the driving part at the instant at which said element moves from normal to abnormal position.

2. A tachometer comprising an axially movable rotary driving shaft having at its outer end a contact element designed to engage the device whose speed is to be determined and having at its inner end a friction disk, a rotary circular support arranged to turn about an axis which is perpendicular to and intersects that of the driving shaft, said support having a friction face with which the edge of the disk normally has driving contact, a plurality of signal levers symmetrically disposed upon the support and each pivoted to turn about an axis eccentric to that of the support, spring means tending to hold the free end of each lever in a normal inner position, the levers and spring means being so designed that the free ends of the levers move outwardly to an abnormal position when the support attains a predetermined definite speed, and adjusting means for moving the shaft axially thereby to vary the speed ratio between the shaft and support, said adjusting means comprising a micrometer screw and cap, and graduations directly showing the relative position of the screw and cap but being designated to indicate the speed of the shaft at any instant at which the levers move to abnormal position.

PRESTON WHITCOMB.
HENRY S. MOORE.